United States Patent
Marchetti

(10) Patent No.: US 11,821,572 B2
(45) Date of Patent: Nov. 21, 2023

(54) LATERALLY COMPLIANT MOUNTING STRUCTURE

(71) Applicant: Raytheon Company, Waltham, MA (US)

(72) Inventor: Paul J. Marchetti, Dracut, MA (US)

(73) Assignee: Raytheon Company, Waltham, MA (US)

(*) Notice: Subject to any disclaimer, the term of this patent is extended or adjusted under 35 U.S.C. 154(b) by 266 days.

(21) Appl. No.: 17/205,035

(22) Filed: Mar. 18, 2021

(65) Prior Publication Data
US 2022/0302572 A1 Sep. 22, 2022

(51) Int. Cl.
| | |
|---|---|
| H01Q 21/00 | (2006.01) |
| F16M 11/10 | (2006.01) |
| F16M 11/04 | (2006.01) |
| F16M 11/08 | (2006.01) |
| H01Q 3/06 | (2006.01) |
| H01Q 1/12 | (2006.01) |

(52) U.S. Cl.
CPC ........... *F16M 11/10* (2013.01); *F16M 11/046* (2013.01); *F16M 11/08* (2013.01); *H01Q 3/06* (2013.01); *H01Q 1/125* (2013.01); *H01Q 21/00* (2013.01)

(58) Field of Classification Search
CPC ...... F16M 11/00; F16M 11/046; F16M 11/08; F16M 13/025; F16M 13/10; F16M 13/18; H01Q 3/06; H01Q 1/125; H01Q 1/1221; F16L 3/1222; F16L 3/137
USPC ...................................................... 248/125.7
See application file for complete search history.

(56) References Cited

U.S. PATENT DOCUMENTS

| | | | | |
|---|---|---|---|---|
| 4,580,461 A | * | 4/1986 | Sears | H01Q 1/18 343/765 |
| 5,112,012 A | * | 5/1992 | Yuan | F16M 11/125 74/89.41 |
| 6,318,923 B1 | | 11/2001 | Davis | |
| 7,528,613 B1 | * | 5/2009 | Thompson | H01Q 3/06 324/637 |
| 9,020,636 B2 | | 4/2015 | Tadayon | |
| 9,293,811 B2 | | 3/2016 | Kosugi et al. | |
| 9,676,502 B2 | * | 6/2017 | Baudassé | F16M 11/2014 |
| 2007/0205338 A1 | | 9/2007 | Sabatino | |
| 2009/0309800 A1 | | 12/2009 | Bulow | |
| 2016/0200456 A1 | * | 7/2016 | Baudassé | F02K 9/84 244/171.2 |

FOREIGN PATENT DOCUMENTS

| | | |
|---|---|---|
| CN | 105717607 A | 6/2016 |
| CN | 111830655 A | 10/2020 |

OTHER PUBLICATIONS

PCT International Search Report and Written Opinion dated Apr. 4, 2022 for International Application No. PCT/US2021/065263; 16 Pages.

\* cited by examiner

*Primary Examiner* — Nkeisha Smith
(74) *Attorney, Agent, or Firm* — DALY, CROWLEY, MOFFORD & DURKEE, LLP

(57) ABSTRACT

Methods and apparatus for a mounting structure including a first arm having a first stiffness and a second arm having a second stiffness, wherein the first stiffness is less than the second stiffness in at least one degree of freedom. The first arm includes a flex region that can deflect in response to loading. In embodiments, the mounting structure can movably secure an antenna array to a pedestal.

16 Claims, 9 Drawing Sheets

LATERALLY COMPLIANT MOUNTING STRUCTURE

BACKGROUND

Radar antennas mounted to deployment mechanisms typically require a means of managing thermal mismatch stress and deflections between the antenna structure and mechanism due to difference in bulk temperatures. Antennas may have a significantly higher temperature than the deployment mechanism. For large span structures, coaxial pin connections may provide a pivot axis for deployment. Typical configurations for addressing thermal mismatch over large spans provide a degree of freedom in the mechanism that allows the structures to expand and contract relative to each other without resistance. In some known systems, this is accomplished using two or more pin joint connections about which the radar antenna is rotated from a stowed position to a deployed position for operation. It is conventional for a single pin joint to be constrained axially, and therefore, react all the loads in the direction of the axis. The other pin joint(s) provides radial restraint but is allowed to float axially to allow differential movement between structures that results from a mismatch of bulk temperatures and materials. For applications where spans and thermal mismatches are small, no special treatment of a dually pined pivot axis may be used. In this configuration the thermal stresses and deflections are absorbed by the primary structures, which need to be designed accordingly.

SUMMARY

Embodiments of the present disclosure provide methods and apparatus for a mounting structure having first and second support arms having different load response characteristics. In embodiments, the first and second support arms connect a structure, such as an antenna array, to dual elevation drive rotary actuator units. Output bearings of the actuators may define the elevation pivot axis and provide the structural load path from the antenna to the support structure. The first support arm provides a relatively flexible region that enables compliance in a direction parallel to the rotation axis. The second support arm provides a relatively stiff connection in all degrees of freedom and directly couples the antenna structure to one of the actuators. Over large spans this flexibility provides a leak path to reduce reaction forces that develop due to thermal mismatch between the antenna and support structures.

In embodiments, stiffness about the rotation axis is approximately equal to reduce twisting deflections. Compliance is achieved by utilizing a thinned section of the first support arm, which acts as a beam structure and allows for a lower spring rate in the narrow dimension while preserving higher stiffness in the other two directions.

One or both of the support arms can comprise the same or different materials having characteristics to meet the needs of a particular application. In example embodiments, the first and second support arms comprise high-strength alloy steel to provide high specific strength and permit thinner sections, resulting in increased flexibility while maintaining the required strength. Additionally, high toughness characteristics support many load cycles over the life of the system to resist fatigue failure.

In example embodiments, a flexible region of the first support arm is approximately 12:1 in length to thickness (e.g., 3.5"×0.30") and sized to keep stresses below the endurance limit of the material. This configuration reduces load buildup due to thermal mismatch stresses while distributing the axial loads between the two support arms. In example embodiments, load share between the first and second support arms in in the order of 70/30% with the stiffer arm reacting the majority of the lateral loads. This type of load share allows the elevation actuator bearings to be more optimally loaded because 100% of the lateral load in is not taken up by a single actuator. This allows for a compact form factor and more direct connection of the actuator torque path to the load.

In one aspect, a system comprises: a base; equipment; and a mounting structure to movably secure the equipment to the base, wherein the mounting structure comprises; a first arm having a first stiffness; and a second arm having a second stiffness, wherein the first stiffness is less than the second stiffness in at least one degree of freedom.

A system can further include one or more of the following features: the base comprises a pedestal and the equipment comprises an antenna array, the pedestal and the mounting structure are configured to move the antenna array from a stowed position to a deployed position by pivoting the antenna array about an elevation axis, the at least one degree of freedom comprises translation movement along the elevation axis or an axis parallel to the elevation axis, the first arm comprises a flex region configured to flex in response to lateral loading, the flex region has a thickness that is less than a thickness of adjacent areas of the first arm, a length of the flex region is at least ten times the thickness of the flex region, the flex region deflects in response to a thermal mismatch between the pedestal and the antenna array, reaction forces at mountings of the mounting structure due to an externally applied lateral load condition are unequally distributed between a first side and second side, and/or reaction forces at the mountings of the mounting structure due to a thermal expansion or contraction load condition are equally distributed between a first side and second side.

In another aspect, a method comprises: movably securing equipment to a base with a mounting structure, wherein the mounting structure comprises; a first arm having a first stiffness; a second arm having a second stiffness, wherein the first stiffness is less than the second stiffness in at least one degree of freedom.

A method can further include one or more of the following features: the base comprises a pedestal and the equipment comprises an antenna array, the pedestal and the mounting structure are configured to move the antenna array from a stowed position to a deployed position by pivoting the antenna array about an elevation axis, the at least one degree of freedom comprises translation movement along the elevation axis or an axis parallel to the elevation axis, the first arm comprises a flex region configured to flex in response to lateral loading, the flex region has a thickness that is less than a thickness of adjacent areas of the first arm, a length of the flex region is at least ten times the thickness of the flex region, the flex region deflects in response to a thermal mismatch between the pedestal and the antenna array, reaction forces at mountings of the mounting structure due to an externally applied lateral load condition are unequally distributed between a first side and second side, and/or reaction forces at the mountings of the mounting structure due to a thermal expansion or contraction load condition are equally distributed between a first side and second side.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1A:
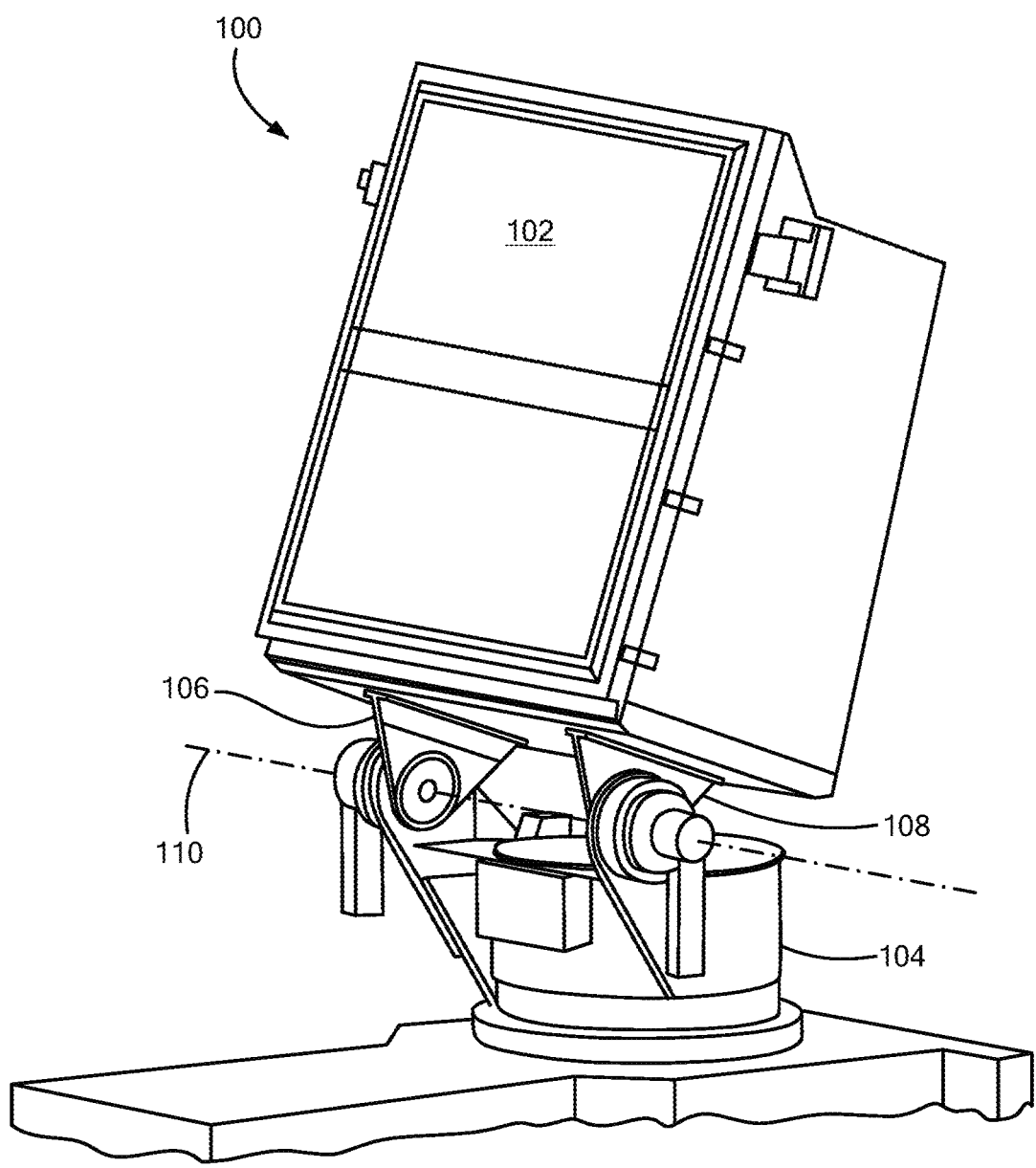
FIGS. 1A and 1B are pictorial representations of a mounting structure for mounting an antenna array on to a pedestal.
Figure 1B:
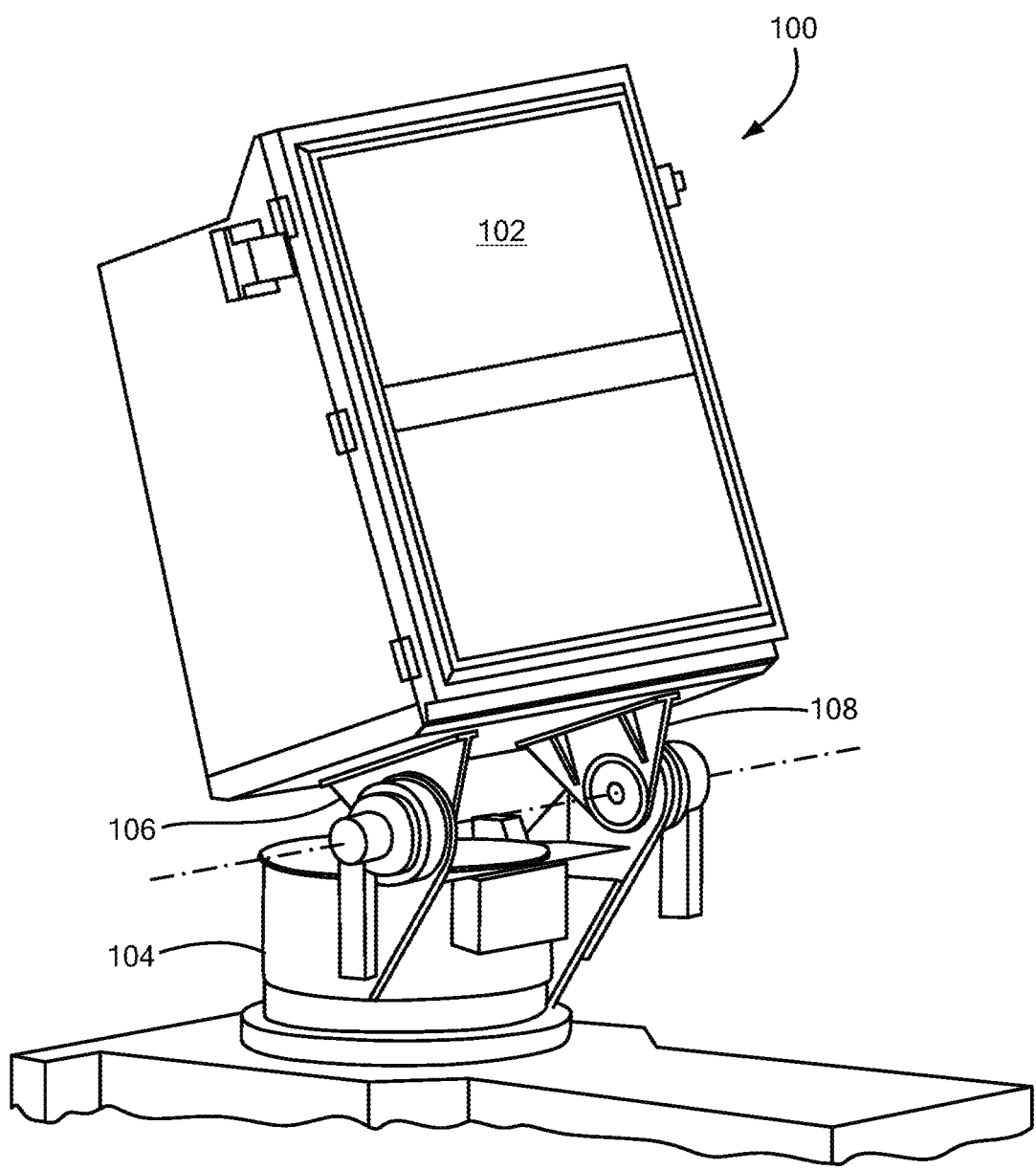

FIGS. 1A and 1B show an example system 100 including a device 102, such as an antenna array, supported by a support structure 104, such as a pedestal. In example embodiments, the support structure 104 can rotate the antenna array 102 from a stowed position to a deployed position. In the illustrated embodiment, the antenna array 102 is shown in the deployed position. A mounting structure can include a first arm 106 and a second arm 108 for securing the antenna array 102 to the support structure 104. As described more fully below, the first arm 106 is more flexible than the second arm 108 in at least one axis. In embodiments, the antenna array 102 pivots about an elevation axis 110. Lateral movement of the antenna array 102 is along the elevation axis 110. That is, lateral movement/loading is side-to-side on the elevation axis 110.

The first and second arms 106, 108 provide unequal reaction loads to the support structure 104 in the lateral direction due to an externally applied load condition, such as inertial transport loads or wind loading, since the first arm 106 is more flexible in response to lateral loads that the second arm 108. This arrangement compensates for different thermal conditions and materials between the array assembly and the pedestal. In operation, the antenna array 102 is significantly warmer than the pedestal 104 and mounting structure 106, 108, especially in cold environments. The first arm 106 is laterally compliant for preventing large thermal stresses from developing between the first and second arms due to mismatch of materials and bulk temperatures. Thermally induced reaction loads are equally distributed between the support structures at each side of the pedestal 104. For a combined (external and thermally induced) load condition, the reaction forces and moments are distributed between the first and second arms 106,108, providing a structurally efficient configuration, where both structures react a portion of the total load.

Figure 2B:
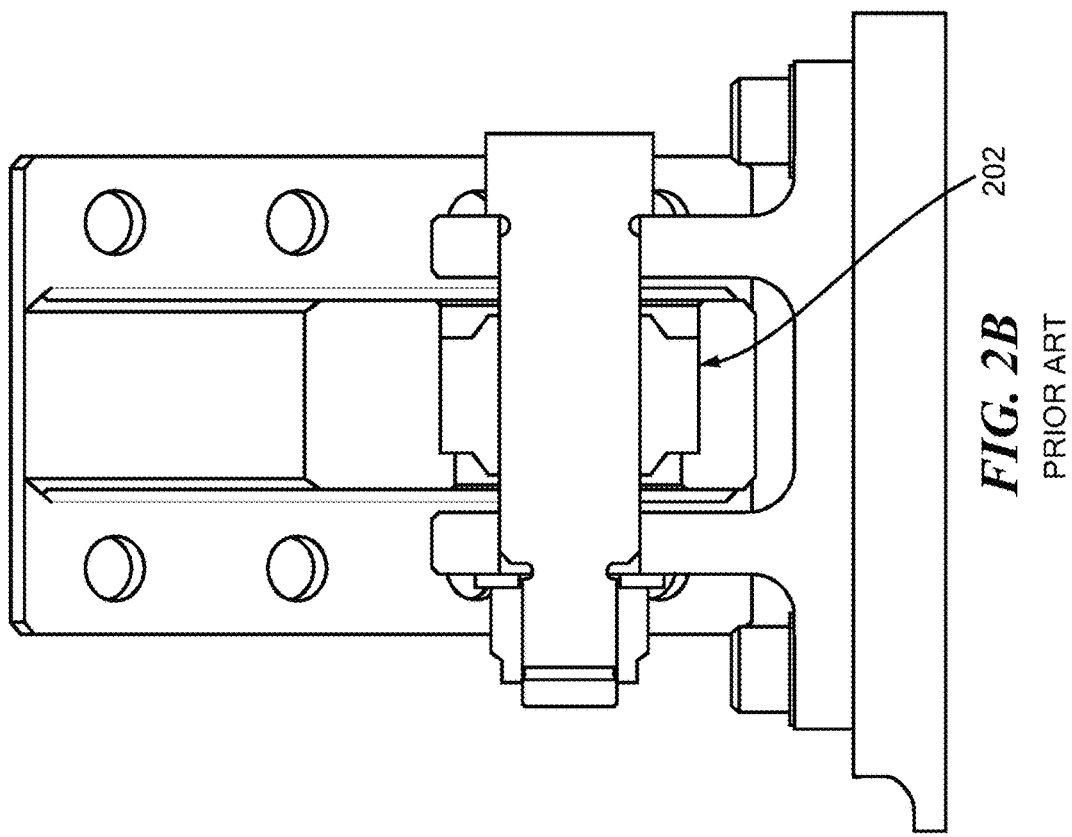
FIG. 2B is a front view of a prior art mounting structure having a floating joint.
Figure 2A:
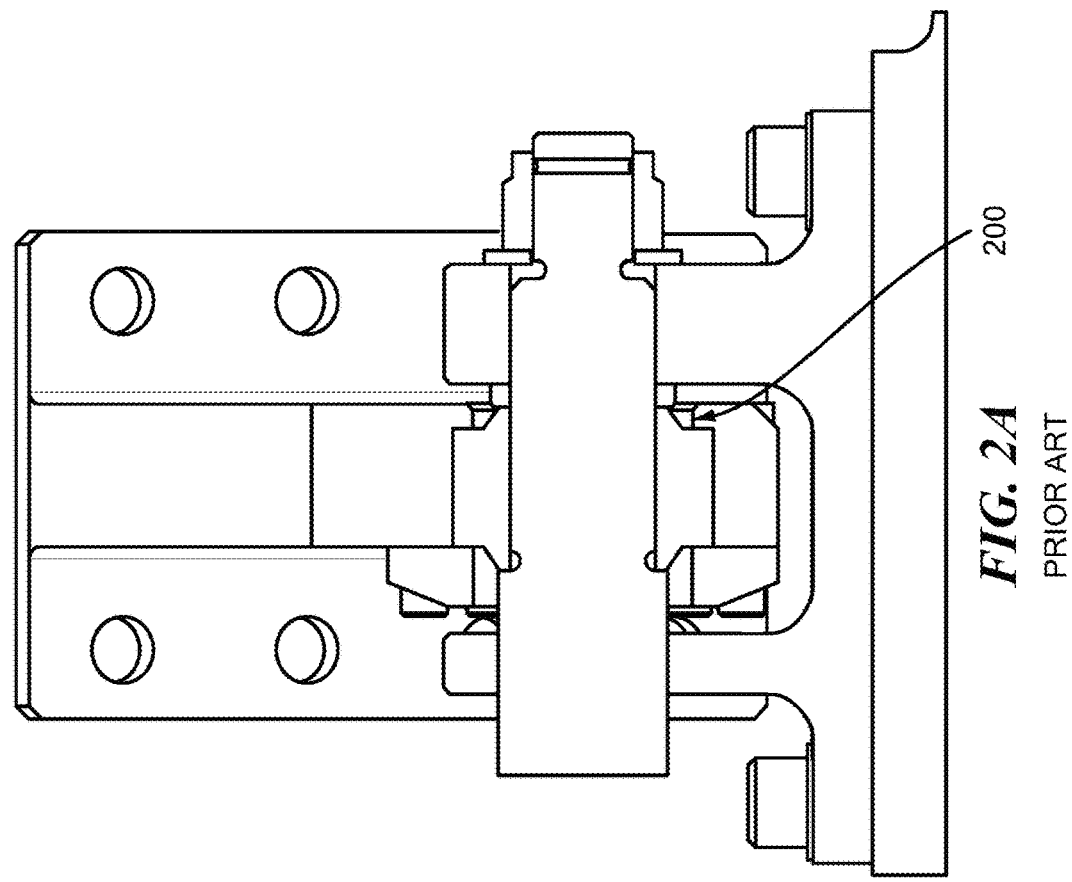
FIG. 2A is a front view of a prior art mounting structure having a clamped joint.

This is contrast to conventional systems in which substantially 100% of lateral loads are carried on one side by one arm while the other arm floats freely to accommodate thermal mismatch. FIG. 2A shows a prior art axis joint with a clamped bearing 200 to carry the lateral loads. FIG. 2B shows a prior art axis joint with a floating bearing 202 that does not carry any lateral loading.

In this configuration, an elevation axis may have two discrete pivot joints along a common axis, one of which is constrained axially (FIG. 2A) while the other "floats" (FIG. 2B). This provides a degree of freedom to allow for thermal mismatch between array and elevation structure but forces all lateral loads to be reacted by a single side, i.e., the clamped side in FIG. 2A, which drives the structural design of that side so that the bearings of the pivot axis and supporting structure need to be sized for 100% lateral loading.

FIGS. 3, 3A, 3B, and 3C show a first arm 300 having a base portion 302 and an arm portion 304 extending from the base portion. The base portion 302 includes a series of holes 306 through which an attachment mechanism, such as bolts, can be used to secure the arm to the antenna array (not shown).

In an example embodiment, the arm portion 304 includes a flex region 308 and a pivot region 310. In embodiments, the flex region 308 has a thickness 312 that is less than at least a portion of the adjacent pivot region 310. In one particular embodiment, a height 314 of the flex region 308 is approximately twelve times the thickness 312 of the flex region 308.

In the illustrated embodiment, the arm portion 304 includes a series of holes 318 for attaching the first arm 300 to the pedestal which may include rotary actuators (not shown). As described above, the pedestal can pivot an antenna array from a stowed position to a deployed position about an elevation axis.

The relieved flex region 308 between the pivot region 310 and the base 302 provides increased compliance in a lateral direction only. The flex region 300 acts as beam with ends fixed to the base portion 302 and the pivot region 310.

The second arm 400 has a base portion 402 and an arm portion 404 extending from the base portion. The base portion 402 includes a series of holes 406 through which an attachment mechanism, such as bolts, can be used to secure the arm to the antenna array (not shown).

The second arm 400 does not have a flex region like the first arm 300. To increase strength, the second arm 400 may include a series of gussets 410 that extend from the base 402.

The first and second arms 300, 400 together provide the required structural strength and stiffness to support the array. In the presence of inertial transport and/or operational loading, complementary lateral stiffness of the first and second arms 300, 400 results in approximately a 30/70% load share between drive unit bearings of the pedestal. In addition, thermally induced load buildup along elevation axis is partially relieved due to the laterally compliant configuration of the first arm 300. The advantages of lower bearing loading requirements will be readily apparent to one skilled in the art.

Figure 3:
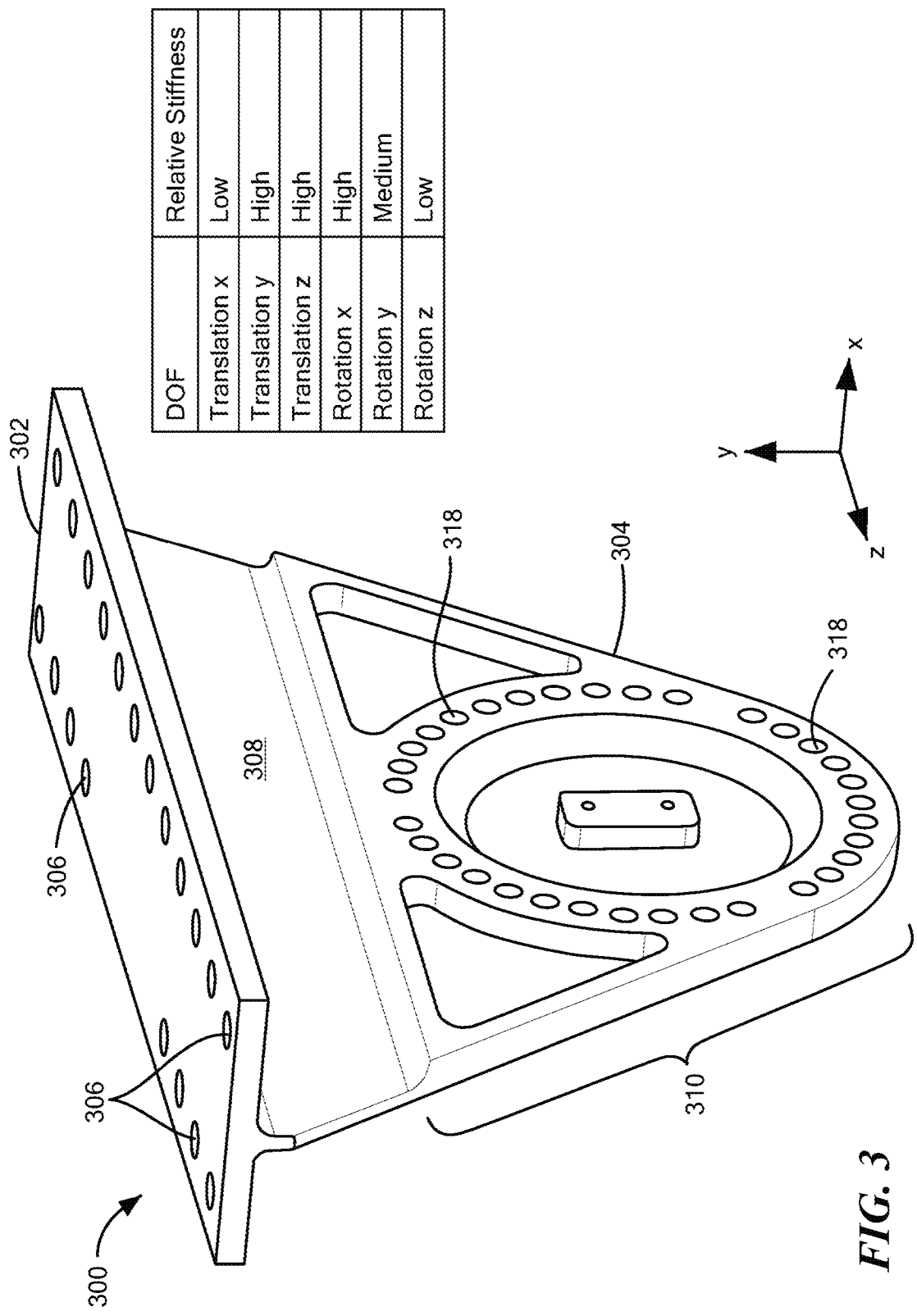
FIG. 3 is an isometric view of an example first arm having a flex region where the first arm forms a part of the mounting structure of FIGS. 1A and 1B.
Figure 3A:
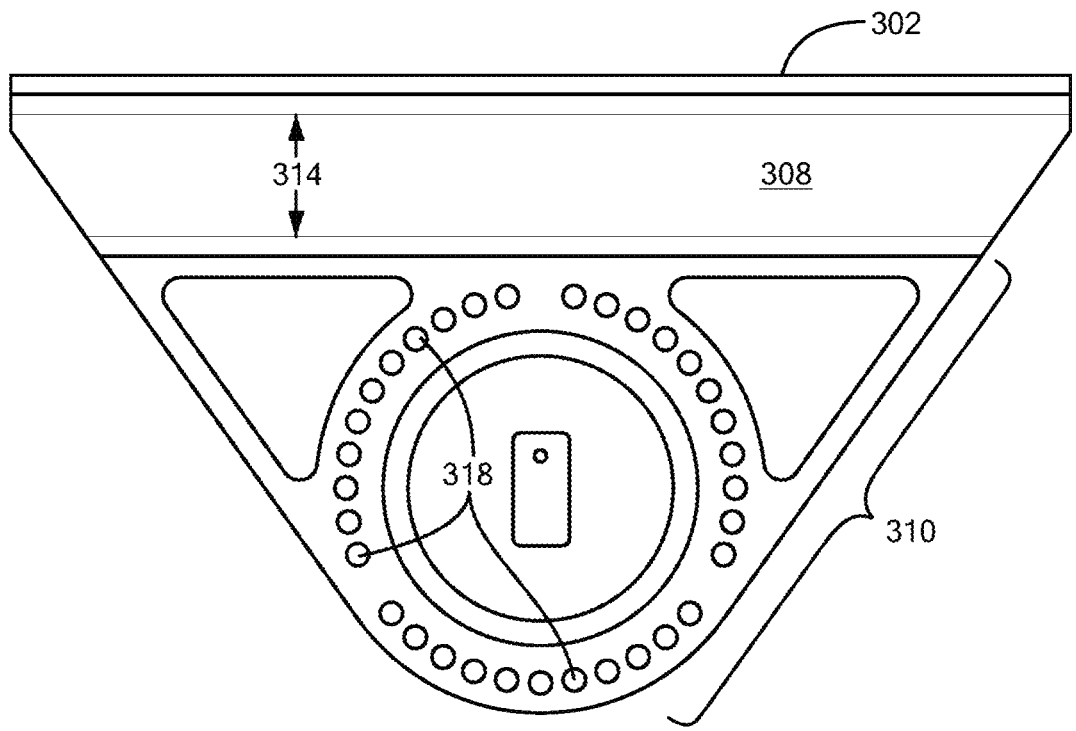
FIG. 3A is a side view.
Figure 3B:
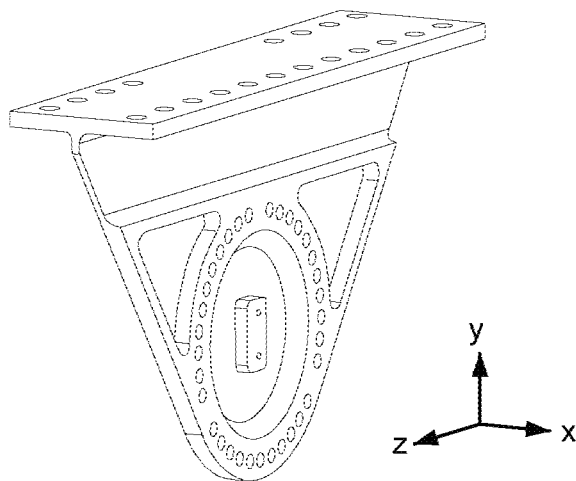
FIG. 3B is a top view.
Figure 3B:
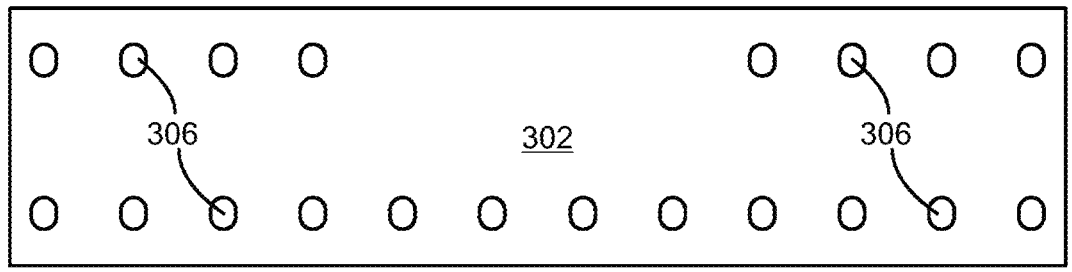
Figure 3C:
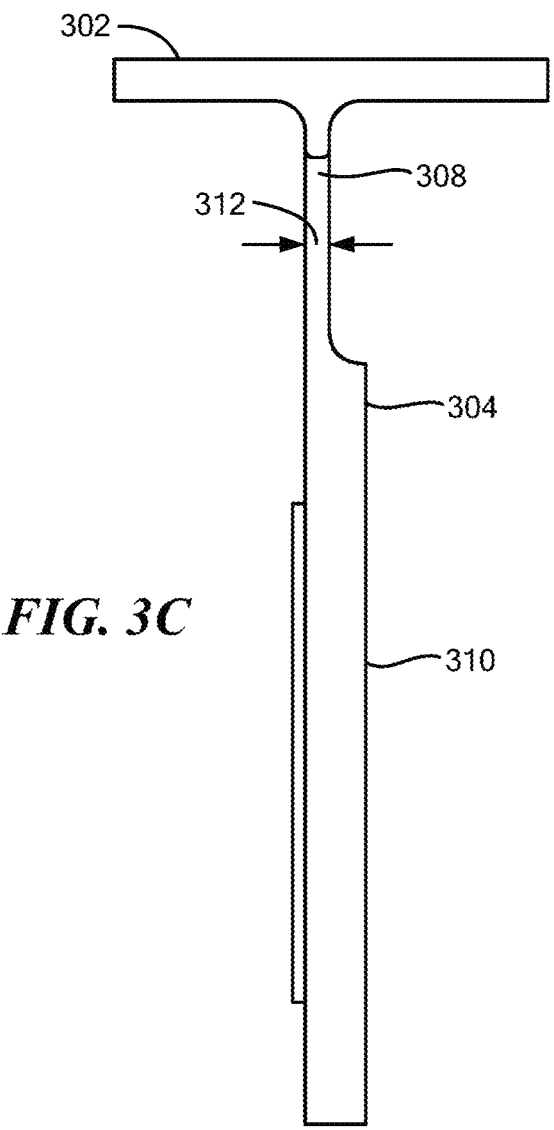
FIG. 3C is a front view of the first arm of FIG. 3.
Figure 4:
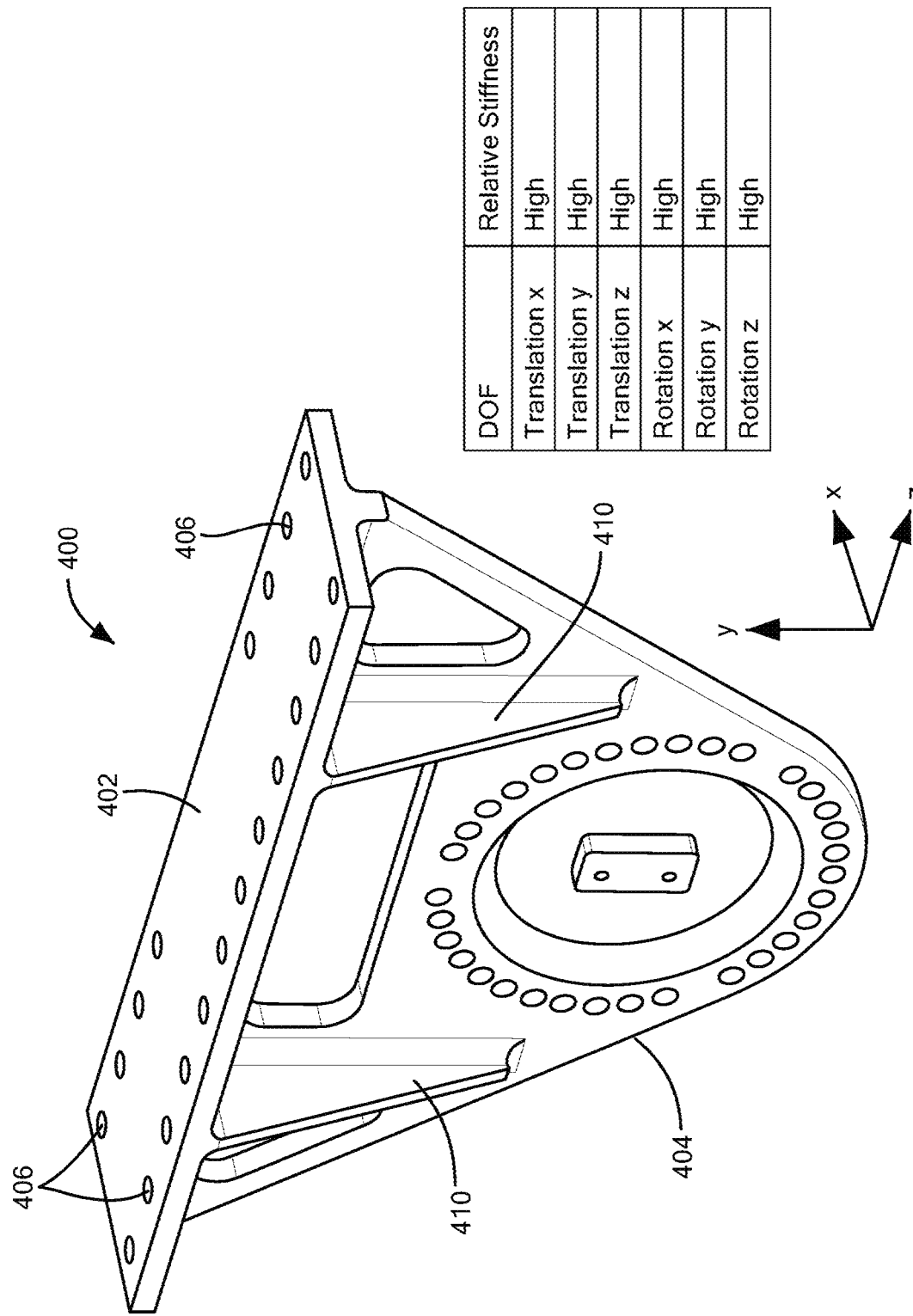
FIG. 4 is an isometric view of an example second arm that forms a part of the mounting structure of FIGS. 1A and 1B.

As shown for the first arm 300 in FIG. 3 and for the second arm 400 FIG. 4, the relative stiffnesses each of the degrees of freedom is dependent upon the structure of the respective arms. As shown in FIG. 3, the flex region 308 results in low stiffness for relative translation between the base portion 302 and the pivot region 310 in the x axis, which is referred to as lateral motion above. In contrast, the second arm 400, which includes gussets 410 and no flex region, has high stiffness in each of the listed degrees of freedom.

The structure of the first arm 300 results in high stiffness in y and z axis translation motion between the base portion 302 and the pivot region 310, as well as relative rotation about the x axis. The first arm 300 has low stiffness for relative rotation about the z axis and medium stiffness for relative rotation about the y axis.

In the illustrated embodiment, an elongated beam length with a triangular shape provides adequate stiffness in longitudinal (z) and vertical (y) directions, high moment stiffness in Rx, medium stiffness in Ry to allow for small magnitude twist (Ry), and low moment stiffness in Rz to allow for the growth accommodation in the lateral (x) direction.

It is understood that low, medium and high are relative terms used to facilitate an understanding of the example embodiments. The use of these terms should not be construed as limiting in any way.

It is understood that the first and second arms 300, 400 can comprise any practical shape to meet the needs of a particular application. In example embodiments, the arms have a generally triangular shape for distributing load for an antenna array mounting to a pedestal.

Figure 3D:
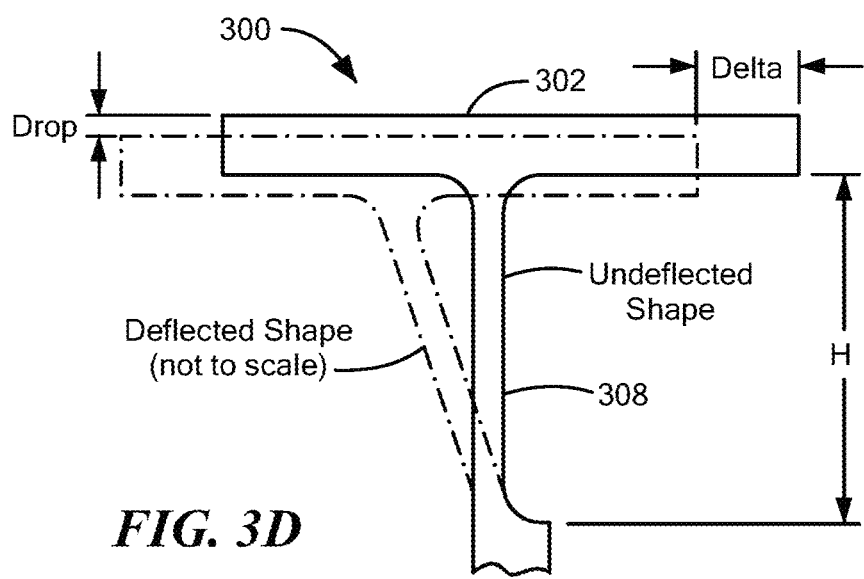
FIG. 3D is a schematic representation of the first arm of FIG. 3 showing a deflected shape and an undeflected shape.

Referring now to FIG. 3D, it can be seen that the flex region 308 of the first arm 300 can bend under simple translational loading. The first arm 308 initially has an undeflected shape in which the base portion 302 is perpendicular to the flex region 308. Under load, the flex region 308 bends and the first arm moves to a deflected shape. As can be seen, the surface of the base portion 302 drops by some amount as the first arm 308 moves from the undeflected shape to the deflected shape. The base portion 302 also moves translationally by some delta amount.

The magnitude of the drop amount is negligible for practical values of deflection. The drop can be nominally defined as:

$$\text{DROP} = H - \sqrt{H^2 - \text{DELTA}^2} \approx 0$$

For example, a 0.010 lateral deflection ("DELTA") on 3.5" high flexible section ("H") results in a drop of 0.000014". Vertical drop is insignificant compared to manufacturing tolerances.

Figure 5A:
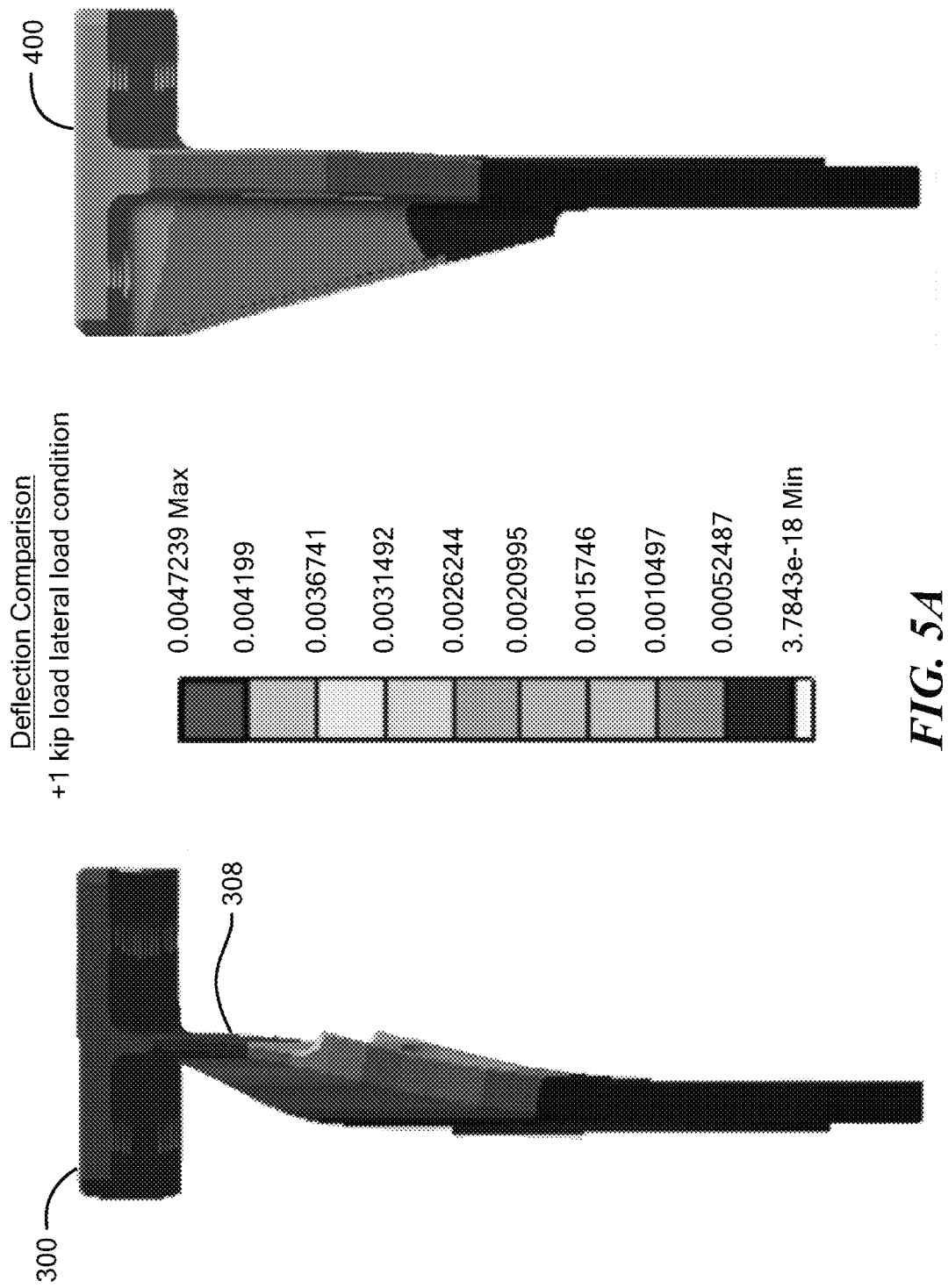
FIG. 5A shows side views of the first and second arms under a positive lateral load.
Figure 5B:
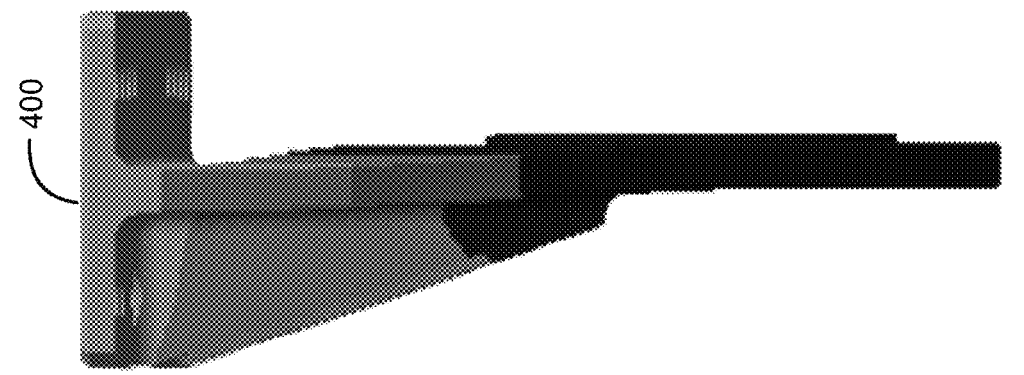
FIG. 5B shows side views of the first and second arms under a negative lateral load.
Figure 5B:
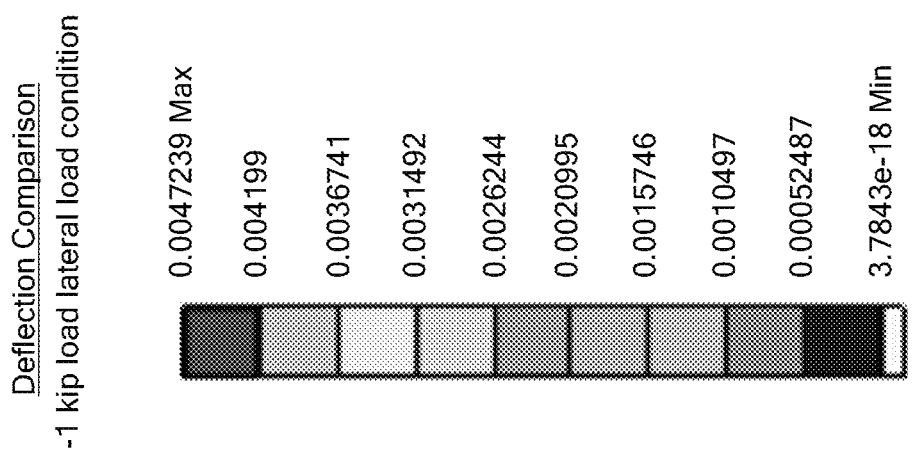
Figure 5B:
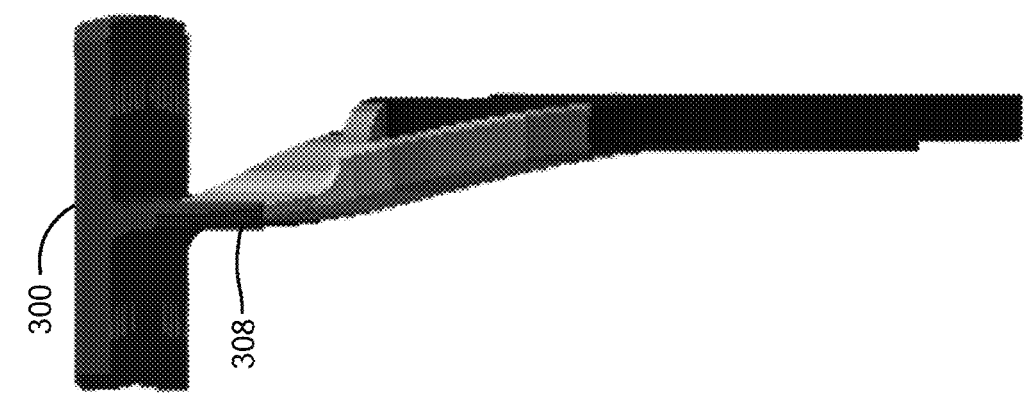

FIG. 5A shows a deflection comparison of the first arm 300 (FIG. 3) and the second arm 400 (FIG. 4) for a 1kip load for a lateral load condition. As noted above, the first arm 300 has a flex region 308 to allow deflection in response to lateral loading. FIG. 5B shows a deflection comparison of the first arm 300 and the second arm 400 for a −1kip load for a lateral load condition.

It is understood that the first and second arms 300, 400 can comprises any suitable material having desired stiffness characteristics. The first and second arms can comprise the same or different materials and can comprise combinations of the same or different materials. An example suitable material for the first and second arms comprises ASTM A514 alloy steel plate.

It is further understood that the first and second arms and coupled systems can be configured to distribute load in a variety of ways to meet the needs of a particular application. In an example embodiment, lateral loading is distributed in 30/70 by percent. Other load distributions can be achieved in alternative embodiments.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system, comprising:
    a base comprising a pedestal;
    equipment comprising an antenna array; and
    a mounting structure to movably secure the equipment to the base, wherein the mounting structure comprises;
        a first arm having a first stiffness, wherein the first arm comprises a flex region configured to deflect in response to a thermal mismatch between the pedestal and the antenna array; and
        a second arm having a second stiffness, wherein the first stiffness is less than the second stiffness in at least one degree of freedom.

2. The system according to claim 1, wherein the pedestal and the mounting structure are configured to move the antenna array from a stowed position to a deployed position by pivoting the antenna array about an elevation axis.

3. The system according to claim 2, wherein the at least one degree of freedom comprises translation movement along the elevation axis or an axis parallel to the elevation axis.

4. The system according to claim 3, wherein the flex region is configured to flex in response to lateral loading.

5. The system according to claim 4, wherein the flex region has a thickness that is less than a thickness of adjacent areas of the first arm.

6. The system according to claim 5, wherein a length of the flex region is at least ten times the thickness of the flex region.

7. The system according to claim 6, wherein reaction forces at mountings of the mounting structure due to an externally applied lateral load condition are unequally distributed between a first side and second side.

8. The system according to claim 6, wherein reaction forces at the mountings of the mounting structure due to a thermal expansion or contraction load condition are equally distributed between a first side and second side.

9. A method, comprising:
    movably securing equipment, wherein the equipment comprises an antenna array, to a base, wherein the base comprises a pedestal, with a mounting structure, wherein the mounting structure comprises;
    a first arm having a first stiffness, wherein the first arm comprises a flex region configured to deflect in response to a thermal mismatch between the pedestal and the antenna array;
    a second arm having a second stiffness, wherein the first stiffness is less than the second stiffness in at least one degree of freedom.

10. The method according to claim 9, wherein the pedestal and the mounting structure are configured to move the antenna array from a stowed position to a deployed position by pivoting the antenna array about an elevation axis.

11. The method according to claim 10, wherein the at least one degree of freedom comprises translation movement along the elevation axis or an axis parallel to the elevation axis.

12. The method according to claim 11, wherein the flex region is configured to flex in response to lateral loading.

13. The method according to claim 12, wherein the flex region has a thickness that is less than a thickness of adjacent areas of the first arm.

14. The method according to claim 13, wherein a length of the flex region is at least ten times the thickness of the flex region.

15. The method according to claim 14, wherein reaction forces at mountings of the mounting structure due to an externally applied lateral load condition are unequally distributed between a first side and second side.

16. The method according to claim 14, wherein reaction forces at the mountings of the mounting structure due to a thermal expansion or contraction load condition are equally distributed between a first side and second side.

* * * * *